M. L. WEISEL.
GARDEN TOOL.
APPLICATION FILED JULY 12, 1910.
999,930.
Patented Aug. 8, 1911.
2 SHEETS—SHEET 1.
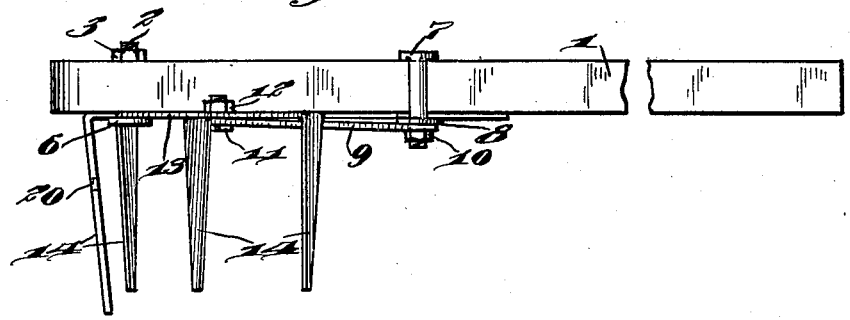
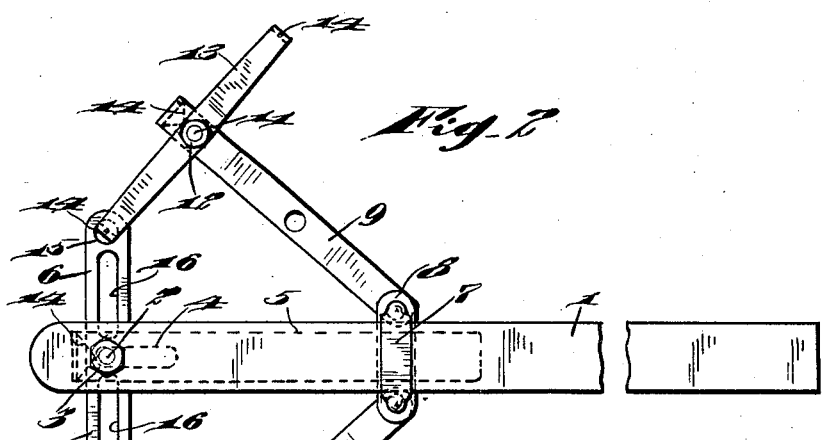
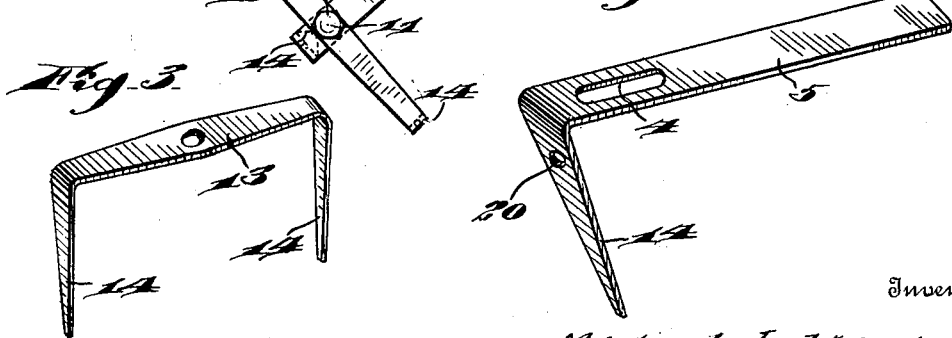
Witnesses
Inventor
Michael L. Weisel,
By Joshua R. H. Potts,
Attorney M. L. WEISEL.
GARDEN TOOL.
APPLICATION FILED JULY 12, 1910.
999,930.
Patented Aug. 8, 1911.
2 SHEETS—SHEET 2.
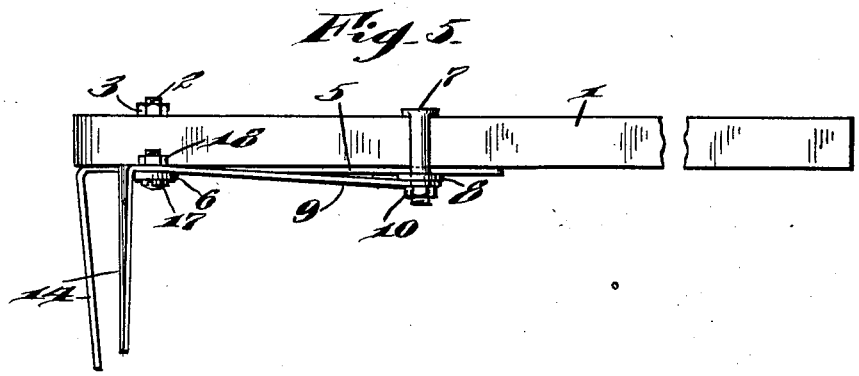
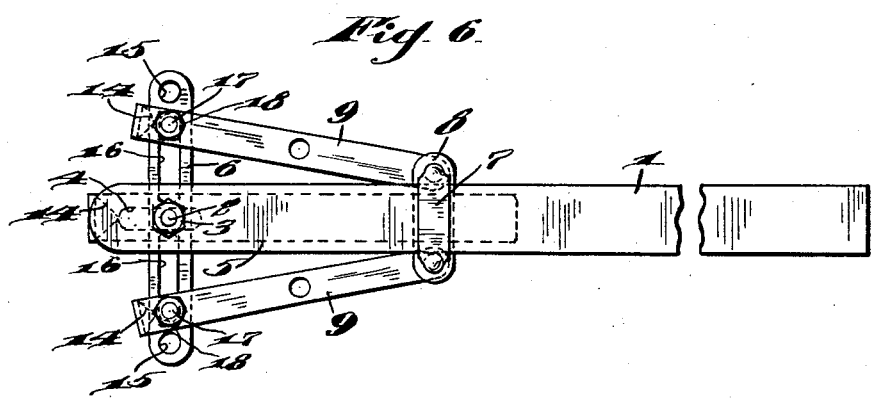
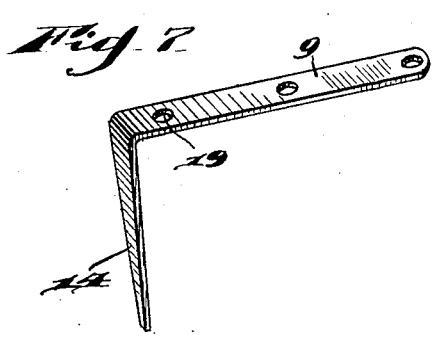
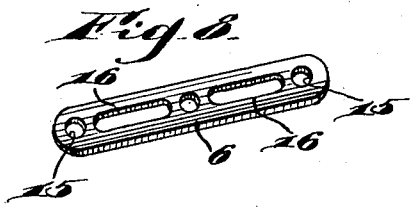
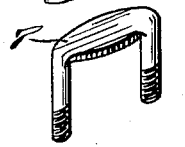
Inventor
Michael L. Weisel,
By Joshua R. H. Potts
Attorney
Witnesses
Theo. Riemann
R. H. Krenkel.
COLUMBIA PLANOGRAPH CO., WASHINGTON, D. C.

UNITED STATES PATENT OFFICE.

MICHAEL LOUIS WEISEL, OF CAMDEN, NEW JERSEY.

GARDEN-TOOL.

999,930. Specification of Letters Patent. Patented Aug. 8, 1911.

Application filed July 12, 1910. Serial No. 571,593.

*To all whom it may concern:*

Be it known that I, MICHAEL LOUIS WEISEL, a citizen of the United States, residing at Camden, in the county of Camden and State of New Jersey, have invented certain new and useful Improvements in Garden-Tools, of which the following is a specification.

My invention relates to improvements in garden tools, the object of the invention being to provide a tool made up of a combination of parts capable of various positions of adjustment, in combination with certain attachments, whereby the tool may be changed to perform various functions, and in fact provide a tool capable of performing practically all of the functions of various well known garden tools.

A further object is to provide a garden tool of this character which is neat and attractive in appearance, strong and durable in use and yet comparatively cheap to manufacture, and which may be put upon the market at a comparatively low cost.

With these and other objects in view, the invention consists in certain novel features of construction and combinations and arrangements of parts, as will be more fully hereinafter described and pointed out in the claims.

In the accompanying drawings: Figure 1, is a view in side elevation illustrating one position of my improved tool when employed as a rake. Fig. 2, is a plan view of Fig. 1. Fig. 3, is a detail perspective view of one of the double toothed bars 13. Fig. 4, is a detail perspective view of the center single toothed bar 5. Fig. 5, is a view in side elevation illustrating a modified arrangement of parts. Fig. 6, is a plan view of Fig. 5. Fig. 7, is a detail perspective view of one of the side single toothed bars 9. Fig. 8, is a view of the center link 6. Figs. 9, and 10, are views of the cross bar 8, and U-bolt 7.

Referring particularly to Figs. 1, and 2, 1 represents a handle through which, near one end, a bolt 2 is projected, and secured by means of a nut 3. This bolt 2 is projected through a slot 4 in a central single toothed bar 5, and also through a central opening in a cross bar 6.

7, represents a U-bolt which is positioned around handle 1, which projects through openings in a cross bar 8, and also through openings in the ends of single toothed bars 9, and is securely held by nuts 10. These single toothed bars 9, near their outer ends, are secured by bolts 11 and nuts 12 to double toothed bars 13, the inner teeth 14 of said bars project through openings 15 in the ends of bar 6, and I have lettered all of the teeth of the several bars 14, as they all perform the same function of rake teeth, when the tool is assembled as shown in Figs. 1 and 2.

By moving the U-bolt 7 longitudinally of handle 1, the teeth may be positioned at various angles or in line with each other, so that a rake of any desired shape may be secured.

Referring to Figs. 5, and 6, the double toothed bars 13 are dispensed with, and the side bars 9 are secured to the link 6 by means of bolts 17 and nuts 18, which are positioned in longitudinal slots 16 in bar 6, said bolts being passed through openings 19 in the bars 9. By reason of these longitudinal slots 16, the toothed bars 9 may be clamped at any desired position relative to the handle, so that the teeth 15 may be positioned as close to each other as may be desired, and a construction of this kind forms what is known as a three toothed rake.

While I have set forth a number of modified positions of the several parts to form various styles of garden tools, my invention is not limited to these several arrangements only, as the device is capable of a great variety of positions and combinations of parts, and I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tool of the character described, comprising a handle, a plurality of longitudinally extending bars, teeth on the free ends of said bars, said bars being secured to the handle, double pronged bars secured to the free ends of the single toothed bars, and a cross bar secured to the handle and having openings in its ends receiving teeth of the double-toothed bars, substantially as described.

2. A garden tool comprising a handle, a U-bolt on the handle at a point removed from the end of the handle, a bolt projected through the handle at one end, a cross bar secured on said bolt intermediate its ends, a plurality of single toothed bars secured to the handle at one end by said U-bolt, and double-toothed bars secured to the single toothed bars and at their inner ends connected with said cross bar, substantially as described.

3. A garden tool comprising a handle, a U-bolt on the handle at a point removed from the end of the handle, a bolt projected through the handle at one end, a cross bar secured on said bolt intermediate its ends, a plurality of single toothed bars secured to the handle at one end by said U-bolt, said cross bar having openings in its ends, double toothed bars having teeth at one end positioned in the openings in the cross bar, and said double toothed bars secured to the outside single toothed bars first-mentioned, substantially as described.

4. A garden tool comprising a handle, a U-bolt on the handle at a point removed from the end of the handle, a bolt projecting through the handle at one end, a plurality of single toothed bars secured to said U-bolt, some of said bars projecting at an angle to the handle, and means connecting the free ends of said single toothed bars with the bolt in the end of the handle, substantially as described.

In testimony whereof I have signed my name to this specification in the presence of two subscribing witnesses.

MICHAEL LOUIS WEISEL.

Witnesses:
R. H. KREUKEL,
C. E. POTTS.

---

Copies of this patent may be obtained for five cents each, by addressing the "Commissioner of Patents, Washington, D. C."